(12) United States Patent
Heiberg et al.

(10) Patent No.: US 10,543,903 B2
(45) Date of Patent: Jan. 28, 2020

(54) ACTUATORS FOR HIGH LIFT DEVICES ON AIRCRAFT

(71) Applicant: The Boeing Company, Chicago, IL (US)

(72) Inventors: Christopher J. Heiberg, Sunset Beach, CA (US); Patrick J. McCormick, Mukilteo, WA (US); Robert J. Atmur, Whittier, CA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 15/253,429

(22) Filed: Aug. 31, 2016

(65) Prior Publication Data

US 2018/0057149 A1    Mar. 1, 2018

(51) Int. Cl.
*B64C 13/34* (2006.01)
*B64C 9/14* (2006.01)

(52) U.S. Cl.
CPC ............. *B64C 13/34* (2013.01); *B64C 9/14* (2013.01)

(58) Field of Classification Search
CPC . B64C 9/14; B64C 13/34; F16H 25/20; F16H 2025/2081; F16H 2025/209; F16H 2035/005; F16H 35/18
USPC .............................................. 244/99.2, 213
See application file for complete search history.

(56) References Cited

U.S. PATENT DOCUMENTS

| | | | | |
|---|---|---|---|---|
| 2,401,097 A | * | 5/1946 | Parilla | B64C 25/30 244/102 R |
| 2,776,577 A | * | 1/1957 | Olchawa | F16H 25/20 244/214 |
| 3,738,183 A | | 6/1973 | Ball, Jr. et al. | |
| 3,927,436 A | | 12/1975 | Inoue et al. | |
| 3,986,689 A | * | 10/1976 | Maltby | B64C 13/24 244/213 |
| 4,346,728 A | | 8/1982 | Sulzer | |
| 4,533,096 A | * | 8/1985 | Baker | B64C 13/32 244/213 |
| 4,834,326 A | * | 5/1989 | Stache | B64C 9/18 244/210 |

(Continued)

FOREIGN PATENT DOCUMENTS

| | | | | |
|---|---|---|---|---|
| DE | 10254129 | | 6/2004 | |
| DE | 10254129 A1 | * | 6/2004 | ........... A47C 20/041 |

OTHER PUBLICATIONS

Karvelis, A. V. (Mar. 1, 2000). Self-locking worm gears: fact or fiction? Retrieved Oct. 11, 2018, from https://www.machinedesign.com/mechanical-drives/self-locking-worm-gears-fact-or-fiction (Year: 2000).*

(Continued)

*Primary Examiner* — Richard R. Green
*Assistant Examiner* — Brady W Frazier
(74) *Attorney, Agent, or Firm* — Hanley, Flight & Zimmerman, LLC

(57) ABSTRACT

Actuators for high lift devices on aircraft are disclosed herein. An example apparatus includes an actuator for a high lift device of an aircraft including a motor and a transmission, where the transmission includes a first gear stage and a second gear stage, the first gear stage including a first worm gear and the second gear stage including a second worm gear, the first worm gear, the second worm gear and the motor operative to prevent backdrive of the actuator.

21 Claims, 6 Drawing Sheets

(56) References Cited

U.S. PATENT DOCUMENTS

| | | | | |
|---|---|---|---|---|
| 5,669,033 A * | 9/1997 | Takata | G03D 3/13 396/612 |
| 6,118,553 A * | 9/2000 | Berg | H04N 1/1077 358/473 |
| 6,439,512 B1 * | 8/2002 | Hart | B64C 13/40 244/178 |
| 6,484,608 B1 * | 11/2002 | Ziavras | B64G 1/66 74/490.09 |
| 7,243,881 B2 | 7/2007 | Sakurai et al. | |
| 7,788,988 B2 * | 9/2010 | Kopecek | B64C 13/28 244/99.2 |
| 7,850,147 B1 * | 12/2010 | Fox | B66D 1/14 254/296 |
| 8,152,098 B2 * | 4/2012 | Hadley | B64C 13/28 188/134 |
| 8,408,518 B2 | 4/2013 | Schade et al. | |
| 2001/0027146 A1 * | 10/2001 | Spaziani | F16H 37/065 477/3 |
| 2003/0233899 A1 | 12/2003 | Ishiyama | |
| 2007/0051477 A1 * | 3/2007 | Fraser | E06B 9/262 160/84.05 |
| 2010/0089191 A1 * | 4/2010 | Martinod | B64C 13/34 74/89.39 |
| 2010/0213310 A1 * | 8/2010 | Flatt | B64C 13/50 244/99.2 |
| 2011/0041632 A1 * | 2/2011 | Baker | B64C 13/28 74/89.23 |
| 2015/0251748 A1 * | 9/2015 | Grand | B64C 13/34 475/5 |

OTHER PUBLICATIONS

Beardmore, R. (Jan. 22, 2013). Worm Gears. Retrieved Oct. 11, 2018, from http://www.roymech.co.uk/Useful_Tables/Drive/Worm_Gears.html. (Year: 2013).*

European Patent Office, "Extended European Search Report," issued in connection with European Patent No. 17187112.2, dated Dec. 8, 2017, 12 pages.

European Patent Office, "Examination Report," issued in connection with European Patent No. 17187112.2, dated Sep. 3, 2019, 7 pages.

* cited by examiner

ACTUATORS FOR HIGH LIFT DEVICES ON AIRCRAFT

FIELD OF THE DISCLOSURE

This disclosure relates generally to actuators and, more particularly, to actuators for high lift devices on aircraft.

BACKGROUND

High lift actuators are used on both leading edges and trailing edges of aircraft wings. On the trailing edge, a high lift actuator may be operative to actuate a flap to control maneuvering of the aircraft. High lift actuators require safety mechanisms to prevent blowback of the surfaces in failure conditions. Typically, the safety mechanisms are additional braking devices attached to the actuator to prevent backdrive of the actuator.

SUMMARY

An example apparatus includes an actuator for a high lift device of an aircraft including a motor and a transmission, where the transmission includes a first gear stage and a second gear stage, the first gear stage including a first worm gear and the second gear stage including a second worm gear, the first worm gear, the second worm gear and the motor operative to prevent backdrive of the actuator.

Another example apparatus includes a first gear stage including a first worm gear having a first lead angle within a first range of lead angles and a second gear stage including a second worm gear having a second lead angle within a second range of lead angles.

An example method includes rotating a first shaft via a motor coupled to a first end of the first shaft, the first shaft including a second end having a first worm gear coupled to the second end, the first worm gear to mesh with a first helical gear; rotating a second shaft via a rotation of the first helical gear coupled to a first end of the second shaft, the second shaft including a second worm gear coupled to a second end of the second shaft, the second worm gear to mesh with a second helical gear, and translating a ball screw within a nut, the nut to translate with the second helical gear as the second helical gear rotates, the ball screw to actuate a control surface of an aircraft.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
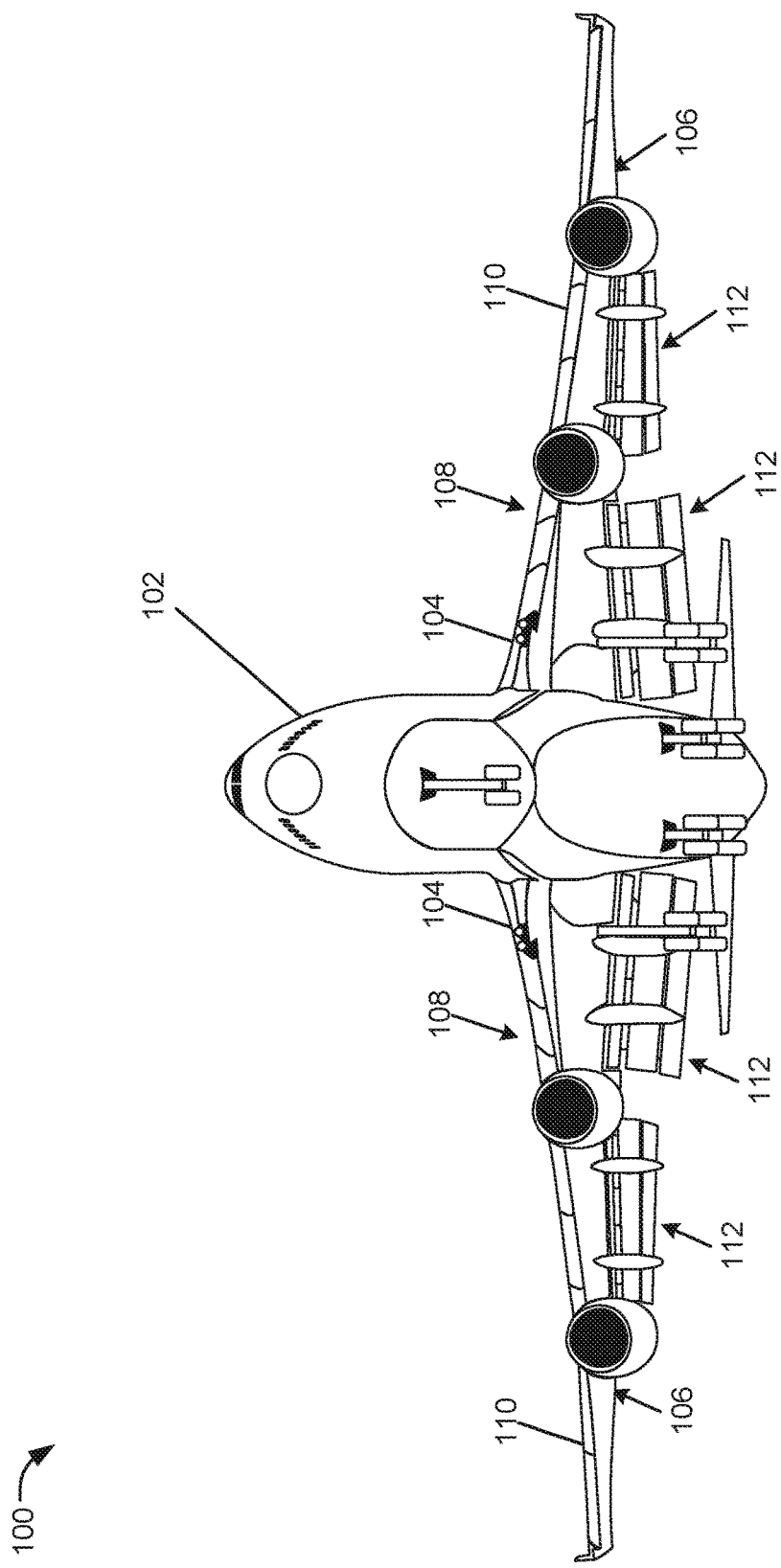
FIG. 1 represents an example environment in which the apparatus disclosed herein may be implemented.

The apparatus disclosed herein may be used with high lift devices on leading edges and trailing edges of wings of an aircraft. Additionally or alternatively, the apparatus disclosed herein may in implemented with submarine vehicles and/or spacecraft. More specifically, the apparatus described herein includes an actuator that includes a transmission with two gear stages to substantially prevent backdrive and a motor having resistive forces or torques to compensate for any remaining backdrive efficiency. Typically, braking devices and/or no-back devices are used to prevent backdrive of an actuator coupled to a control surface (e.g., a flap) of, for example, an aircraft. However, these braking devices are heavy, expensive, and unreliable. The example actuator described herein may be used to actuate high lift devices such as aircraft flaps, while preventing backdrive of the high lift devices without the use of additional braking devices.

In an example actuator for a high lift device described herein, a motor is coupled to a transmission including a first gear stage and a second gear stage. The first and second gear stages include respective first and second worm gears and first and second worm wheels. The first and second worm gears along with the motor prevent backdrive of the actuator. That is, the reduced backdrive efficiency is sufficiently small such that the resistive forces and torques of the motor can compensate for or withstand the remaining backdrive force to substantially prevent backdrive of the actuator. Thus, the high lift device cannot be forced in a direction against the direction in which the high lift device is being actuated. In some examples, the first and second worm gears reduce the backdrive efficiency to less than one percent.

The first worm gear of the first gear stage in the example actuator is coupled to the motor via an input shaft. The input shaft is operative to rotate the first worm gear, which meshes with a corresponding first gear or worm wheel (e.g., a first helical gear). The first worm gear and first worm wheel form the first gear stage of the transmission. The first worm wheel is coupled to the second worm gear via a shaft. The second worm gear meshes with a corresponding second gear or worm wheel (e.g., a second helical gears). The second worm gear and the second worm wheel form the second gear stage of the transmission. In some examples, a third or additional gear stage is coupled to the second gear stage via a shaft. In the examples illustrated herein, the second worm wheel is coupled to a nut. The nut is operative to rotate in conjunction with the second worm wheel and cause a ball screw and a rod end of the ball screw to translate in response to the rotation of the nut. The translation of the ball screw and rod end operates (e.g., actuates) the high lift device of the aircraft.

The first and second worm gears of the examples illustrated herein have lead angles that are ten degrees or less. In some examples, the first worm gear has a first lead angle smaller than a second lead angle of the second worm gear. The first worm gear and the second worm gear in the examples illustrated herein each have a forward drive efficiency of approximately 81 percent and a backdrive efficiency of approximately 1.5 percent. The combination of the first and second gear stages results in a total forward drive efficiency of approximately 64 percent and a backdrive efficiency of less than one percent. Using different lead angles for one or more of the worm gears may vary the forward drive efficiency and backdrive efficiency of the example actuator. Additionally, the resistive forces and torques of the motor are at least 0.03 in-lbs and will not backdrive under loads up to 9,930 lbs. Thus, the remaining backdrive torque (i.e., due to the backdrive efficiency of less than 1 percent) is overcome by the motor to prevent backdrive of the actuator and maintain a position of the high lift device.

FIG. 1 represents an example environment 100 in which the example apparatus disclosed herein may be implemented. The example environment 100 includes an aircraft 102 that includes high lift devices coupled to leading edges 104 and trailing edges 106 of respective wings 108 of the aircraft 102. Alternatively, other vehicles having high lift devices and/or pointed devices may be used in conjunction with the example apparatus described herein, including submarine vehicles, spacecraft, etc. The high lift devices of the aircraft 102 include leading edge flaps 110 and trailing edge flaps 112 to assist in control of the aircraft 102 during takeoff, flight, and landing by changing the camber of wings 108 of the aircraft and, thus, the path of airflow around the wings 108. In the illustrated example, the leading edge flaps 110 and the trailing edge flaps 112 are depicted in a landing position. That is, the leading edge flaps 110 extend forward from the leading edge 104 and the trailing edge flaps 112 extend aft of a trailing edge 106 and downward.

The leading edge flaps 110 and trailing edge flaps 112 experience large forces from the air flowing around the wings 108, particularly when the flaps 110, 112 are extended. Typically, actuators (e.g., the example actuator 200 of FIG. 2) are used to position the flaps 110, 112 and include additional braking devices or no-back devices to prevent backdrive of the actuator and maintain a position of the flaps 110, 112. However, these additional devices are expensive and add weight to the aircraft 102, which may reduce a fuel efficiency of the aircraft 102.

The example actuator for high lift devices 110, 112 described herein does not include additional devices, thus reducing cost and improving fuel efficiency of the aircraft 102. Additionally, the example apparatus described herein may increase reliability of the actuator and the high lift devices 110, 112 because fewer components are used to enable the proper function of the high lift devices 110, 112 and, thus, the likelihood that the apparatus will not function due to failure of a component decreases.

Figure 2:
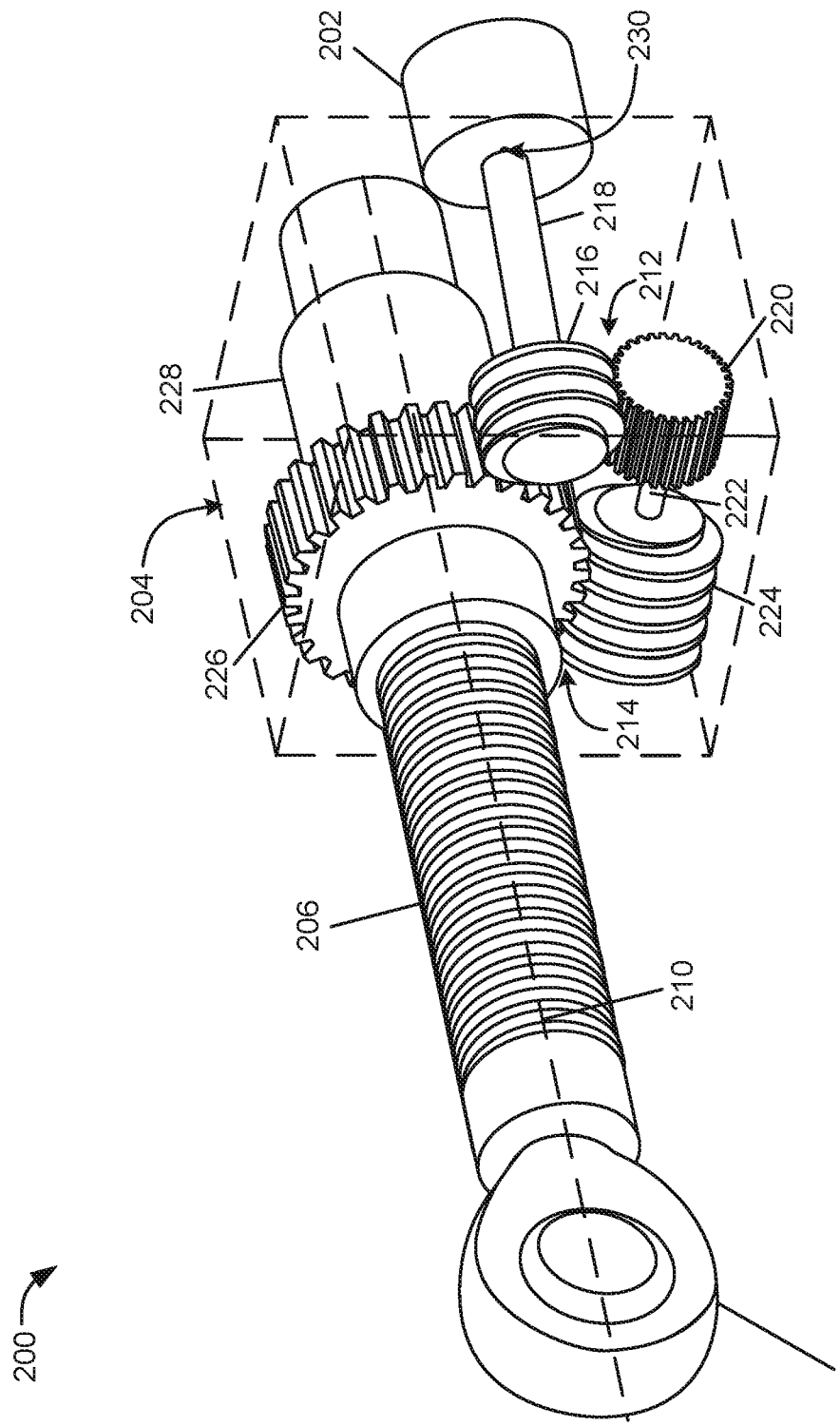
FIG. 2 is a diagram of an example actuator that may be implemented on an aircraft.

FIG. 2 is a diagram of an example actuator 200 disclosed herein that may be implemented to adjust the flaps 110, 112 or other control surfaces during operation of the example aircraft 102 of FIG. 1. The example actuator 200 includes a motor 202, a transmission 204, and a ball screw 206 with a rod end 208. The example motor 202 provides power to and operates the transmission 204 to rotate the ball screw 206. The example motor 202 may be an electric motor, a hydraulic motor, or any other type of motor suitable for use with the example apparatus. As the ball screw 206 is rotated, the rod end 208 is translated along an axis 210 of the ball screw 206 to actuate the flap 110, 112. Alternatively, a lead screw may be used in place of the ball screw 206. The example rod end 208 is coupled to a flap 110, 112 and is operative to extend the flap 110, 112 from the edge 104, 106 of the wing 108.

The example transmission 204 includes a multi-stage (e.g., at least two stages) worm gear arrangement where each stage is coupled in series. In some examples, the transmission is enclosed in a housing. The transmission 204 illustrated in FIG. 2 includes first and second gear stages 212, 214, where each gear stage includes a worm gear and a worm wheel (e.g., a helical gear). The first gear stage 212 (e.g., the input worm stage) of the transmission 204 includes a first worm gear 216 coupled to the motor 202 via an input shaft 218. The motor 202 is operative to rotate the input shaft 218 and, thus, the first worm gear 216 in first and second directions. Rotating the input shaft 218 in the first or second direction causes rotation of a first worm wheel 220 accordingly. The first worm wheel 220 is coupled to and rotates an intermediate shaft 222 between the first gear stage 212 and the second gear stage 214. The intermediate shaft 222 is also coupled to and rotates a second worm gear 224 of the second gear stage 214 (e.g., the output gear stage), which is coupled to a second worm wheel 226. As the second worm gear 224 causes rotation of the second worm wheel 226, which is also coupled to the ball screw 206 via a nut 228. The example second worm wheel 226 is fixedly coupled to the nut 228 such that as the second worm wheel 226 rotates, the nut 228 rotates and causes the ball screw 206 to translate along the axis 210 of the ball screw 206.

The ball screw 206 translates in a first direction when the input shaft 218 is rotated in first direction and in a second direction when the input shaft 218 is rotated in a second direction. For example, based on the respective pitch direction of the worm gears 216, 224 (e.g., left hand worm gears, right hand worm gears), the ball screw 206 may translate in the first direction to cause the flaps 110, 112 to extend when the input shaft 218 is rotated in the first direction and translate in the second direction to cause the flaps 110, 112 to retract when the input shaft 218 is rotated in the second direction. In other examples, the transmission 204 may be configured such that rotating the input shaft 218 in the first direction causes the flaps 110, 112 to retract and rotating the input shaft 218 in the second direction causes the flaps 110, 112 to extend. In some examples, the second worm wheel 226 and the nut 228 may be integral and the transmission 204 may not include a separate nut 228 operatively disposed between the second worm wheel 226 and the ball screw 206, as shown in FIG. 2.

In some examples, the input shaft 218 may include a detent 230 at the interface between the input shaft 218 and the motor 202. The detent 230 may be operative to add a known resistive force or torque (i.e., due to friction) that may at least partially counter-act any backdrive force or torque from the first gear stage 212. The example detent 230 may be small enough such that the detent 230 does not significantly affect the forward drive efficiency of the motor 202 and transmission 204. Other types of resistive forces and/or torques inherent in the motor 202 may be operative to counter-act any remaining backdrive force or torque. Preventing backdrive of the actuator maintains a position of the flaps 110, 112 during maneuvers (e.g., takeoff, landing) performed by the aircraft 102. Alternatively, the detent 230 may be positioned on a face of the first worm gear 216.

Figure 3:
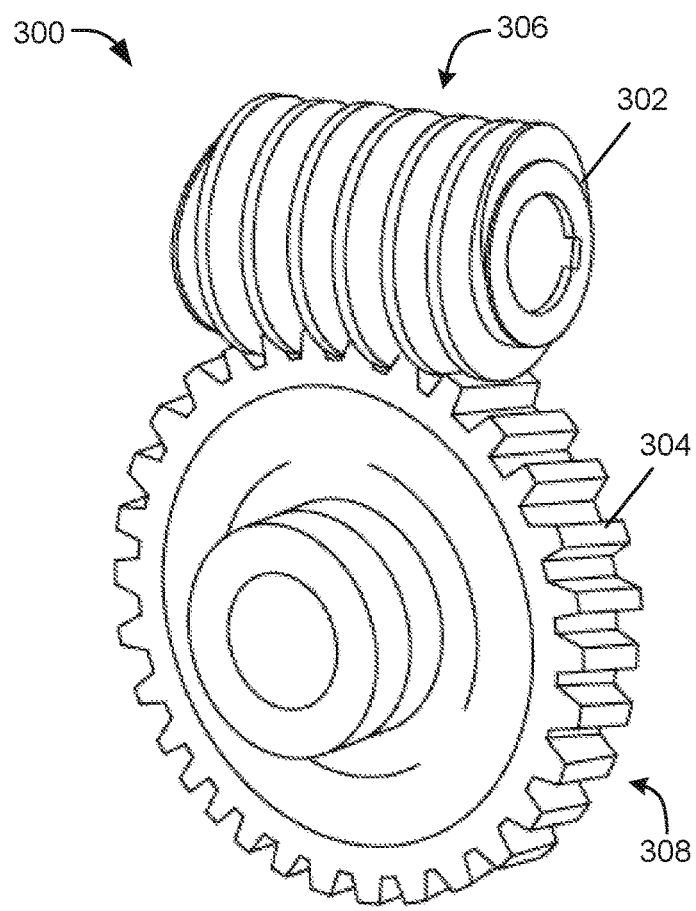
FIG. 3 is a diagram of an example gear mesh that may be included in the example actuator.

FIG. 3 depicts an example gear stage 300 (e.g., the first gear stage 212, the second gear stage 214) in more detail with an example worm gear 302 (e.g., the first worm 216, the second worm gear 224) and an example worm wheel 304 (e.g., the first worm wheel 220, the second worm wheel 226). The particular illustrated example gear stage 300 shown in FIG. 3 may be implemented with an aircraft (e.g., the aircraft 102 of FIG. 1). As shown in FIG. 3, the example worm gear 302 has teeth 306 at a designated lead angle and the example worm wheel 304 has teeth 308 with a corresponding angle such that as the worm gear 302 is rotated (e.g., by a shaft), the teeth 308 of the worm wheel 304 are meshed with the teeth 306 of the worm gear 302 to rotate the worm wheel 304.

Figure 4:
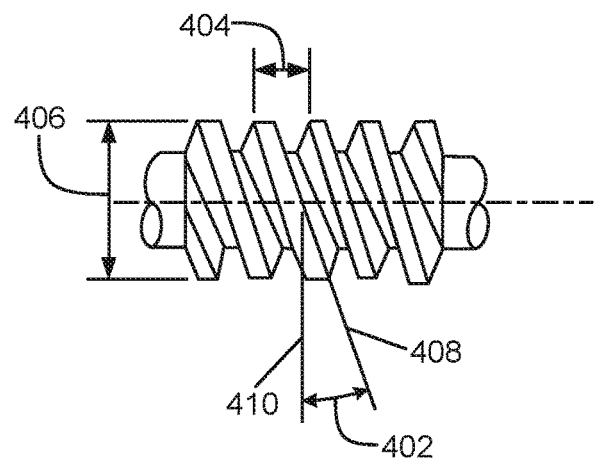
FIG. 4 is a diagram of an example worm gear.

FIG. 4 is a diagram of a side view of a worm gear (e.g., the first gear stage 212, the second gear stage 214). The diagram of the worm gear is annotated to illustrate various measurements of a worm gear, including a lead angle 402, axial pitch 404, and gear diameter 406. The lead angle 402 of a worm gear is the angle between a helix 408 and the plane of rotation 410. The axial pitch of a worm gear is the distance between a point on a tooth of the gear and a corresponding point on an adjacent tooth.

Figure 5:
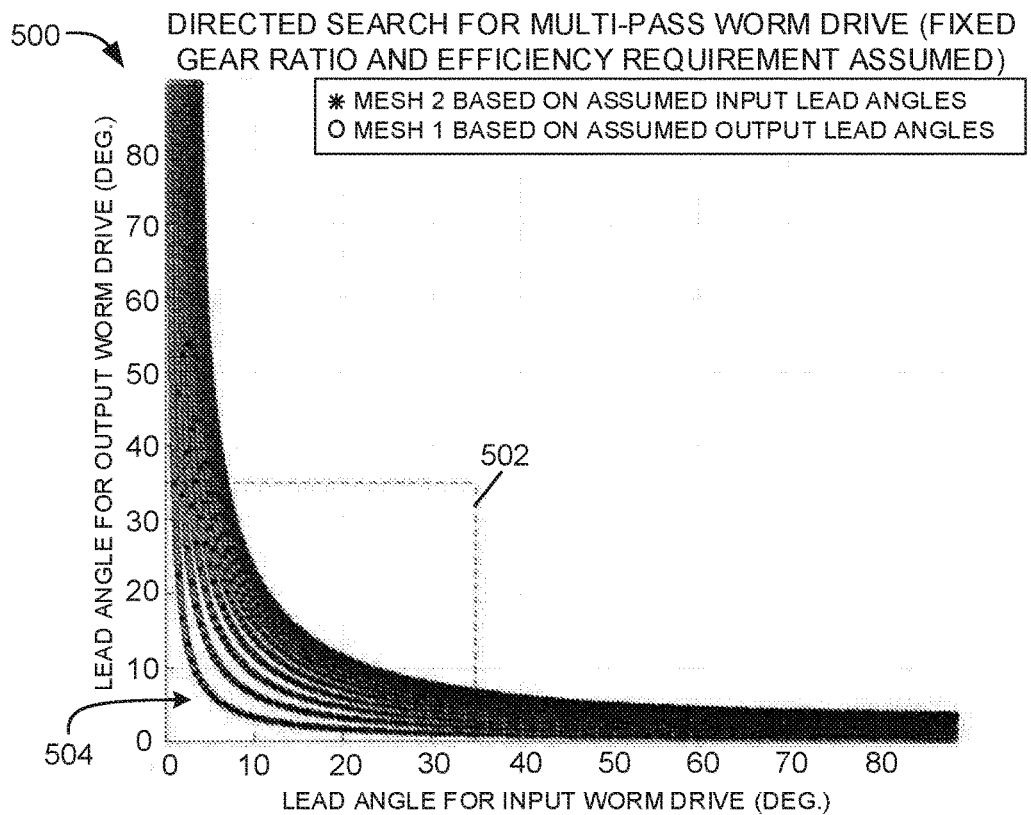
FIG. 5 depicts a chart indicating example ranges of lead angles that may be implemented with the example apparatus described herein.

FIG. 5 depicts a chart 500 indicating an example range 502 of the lead angles that may be implemented with the example actuator 200 described herein. The chart 500 depicts various sets 504 of potential lead angles that may be used in conjunction with the example actuator 200 to prevent backdrive. Each set 504 is determined using a different gear ratio. Other sets 504 of potential lead angles may be determined using other gear ratios. Any lead angles for the first gear and the second gear that sufficiently prevents backdrive while allowing for a desired forward drive efficiency may be implemented with the example actuator 200 described herein. The determined range 502 of lead angles that may be implemented with the example actuator 200 satisfy a requirement of an actuator backdrive torque at the input (e.g., the motor 202) given a load at the output (e.g., a force applied to the flaps 110, 112 by air flowing around the wing). The torque at the input ($\Gamma_m$) is the torque at the input source that is required to hold or counteract the force (F) applied to the flaps 110, 112. For design purposes, maximum values of the force and/or minimum values of the torque may be used to ensure that the determined range 502 of lead angles is sufficient to prevent backdrive of the actuator 200. For the purposes of the illustrated example equations below, the force (F) acts against the ball screw 206 and rod end 208 in the axis 210 of the ball screw 210. To determine the range 502 of lead angles that are sufficient to prevent back drive of the example actuator 200, Equation 1 may be used, where $\Gamma_m$ is the torque at the input, F is the force, $\theta_1$ is the lead angle of the output gear mesh (e.g., the second gear stage 214), $\theta_2$ is the lead angle of the input gear mesh (e.g., the first gear stage 212), $GR_1$ is the output mesh gear ratio, $GR_2$ is the input gear ratio, BSL is the lead of the ball screw 206, and $\eta_B$ is the backdrive efficiency of the ball screw 206.

$$\Gamma_m = F\left(\frac{BSL}{2\pi}\right)\eta_B\left(\frac{\sin\theta_1}{GR_1}\frac{\sin\theta_2}{GR_2}\right) \quad \text{Equation 1}$$

Further, Equation 1 can be rearranged as Equation 2 to create a constant (C) so that the lead angles $\theta_1$, $\theta_2$ can be varied to determine a range of angles that satisfy Equation 2.

$$\frac{\Gamma_m}{F\left(\frac{BSL}{2\pi}\right)\eta_B} = \left(\frac{\sin\theta_1}{GR_1}\frac{\sin\theta_2}{GR_2}\right) = C \quad \text{Equation 2}$$

Because the left side of Equation 2 is constant for each system (i.e., the lead of the ball screw 206 (BSL), the force (F), and torque ($\Gamma_m$) will not change for a given system and the backdrive efficiency ($\eta_B$) may be a designated backdrive efficiency for the actuator 200), the lead angles $\theta_1$, $\theta_2$ can be varied to create the chart 500 in FIG. 5. The chart 500 of FIG. 5 shows that the reasonable range 502 of acceptable lead angles is between 0 and approximately 35 (e.g, a ±35 degree range) degrees for both lead angles $\theta_1$, $\theta_2$. Most potential lead angles fall within a range of 0 to 20 degrees (e.g., a ±20 degree range). Lower lead angles may facilitate easy manufacture of the actuator, but any of the potential lead angles indicated in the chart 500 may be feasible for implementing the example actuator 200. Additionally, larger lead angles, while reducing the backdrive efficiency, also reduce the forward drive efficiency. Thus, to achieve a desirable forward drive efficiency, a range 502 of lead angles may be reduced to between 0 and approximately 10 degrees. In some examples, resistive forces and/or torques of the motor can compensate for any remaining backdrive not prevented by the first and second gear stages 212, 214. The resistive forces and/or torques of the motor 202 may be based on the type of motor, motor permanent magnets, friction, etc.

A variance of the example range of lead angles may be determined using Equation 3 below, where there are i independent parameters in system f, where f is the constant C from Equation 2.

$$\sigma_c = \left(\sum_{i=1}^{n}\left(\frac{\partial f}{\partial x_i}\right)^2 (\sigma_{x_i})^2\right)^{\frac{1}{2}} \quad \text{Equation 3}$$

To simplify Equation 3, assumptions can be made, including a relationship between the gear ratios $GR_1$, $GR_2$ and the respective lead angles $\theta_1$, $\theta_2$ such that a larger gear ratio can be offset by a larger lead angle. Additionally, an assumption can be made that the gear ratios are fixed. Thus, Equation 3 simplifies to Equation 4 below, which may be iterated until the design requirements (e.g., backdrive efficiency, forward drive efficiency, any physical or interface requirements, etc.) are met and/or optimized.

$$\sigma_{\theta_1} = \sqrt{\frac{\sigma_c^2 - \left(\frac{\sin\theta_1 \cos\theta_2}{GR_1 GR_2}\right)^2 \sigma_{\theta_2}^2}{\left(\frac{\cos\theta_1 \sin\theta_2}{GR_1 GR_2}\right)^2}} \quad \text{Equation 4}$$

In some examples, a variance of the lead angles $\theta_1$, $\theta_2$ may be 10 degrees±10 degrees. Alternatively, the variance may be any variance that satisfies Equation 6 with lead angles that satisfy Equation 2 using an iterative process. For example, an iterative process may include selecting the design requirements, determining a range of lead angles that satisfy the efficiency requirements, select lead angles from the range of lead angles that satisfy a physical gear design, and iterate the determination of the range of lead angles and selection of lead angles until all requirements are met and/or optimized.

The example range 502 of lead angles may be determined based on a number of assumptions in addition to the assumptions made above. For example, it may be assumed that the actuator is a two-pass worm drive actuator 200, fixed gear ratios for the input and the output are used, and an efficiency ratio requirement is given. However, in implementations other than the illustrated example, other assumptions may be made. Any number of multiple passes may be used instead of the example two-pass actuator 202 used herein. Further, the efficiency ratio requirement may be altered for different implementations and/or other efficiency requirements (e.g., total output efficiency) may be used.

In one particular example, the first worm gear 216 has a first lead angle of approximately ten degrees or less. In the illustrated example, the first lead angle is approximately 4.5 degrees. As used herein when referring to degrees of a lead angle, the term approximately may include any angle within the determined variance, which may be, for example, 10 degrees ±10 degrees, as discussed above. The first worm gear 216 meshes with the first worm wheel 220 to form the first gear stage 212. The lead angle may define the friction angle of the worm gear 216 and the first worm wheel 220. Assuming the ball screw transfers all of the force from the flap 110, 112 into torque on the driven gear (e.g., the worm wheel 220, 226), Equation 5 below can be used to determine the force of the backdrive on the gears, where n is the number of teeth and DP is the diametral pitch of the worm wheel 220, 226.

$$P_{backdrive} = \frac{P_{ballscrew} n}{2DP} \quad \text{Equation 5}$$

The smaller the friction angle, the smaller the backdrive torque of the worm gear 216, 224. The backdrive torque can be determined using Equation 6, where θ is the lead angle and μ is a friction coefficient.

$$T_{backdrive} \approx \mu(P_{backdrive} \sin \theta) \quad \text{Equation 6}$$

Figure 6:
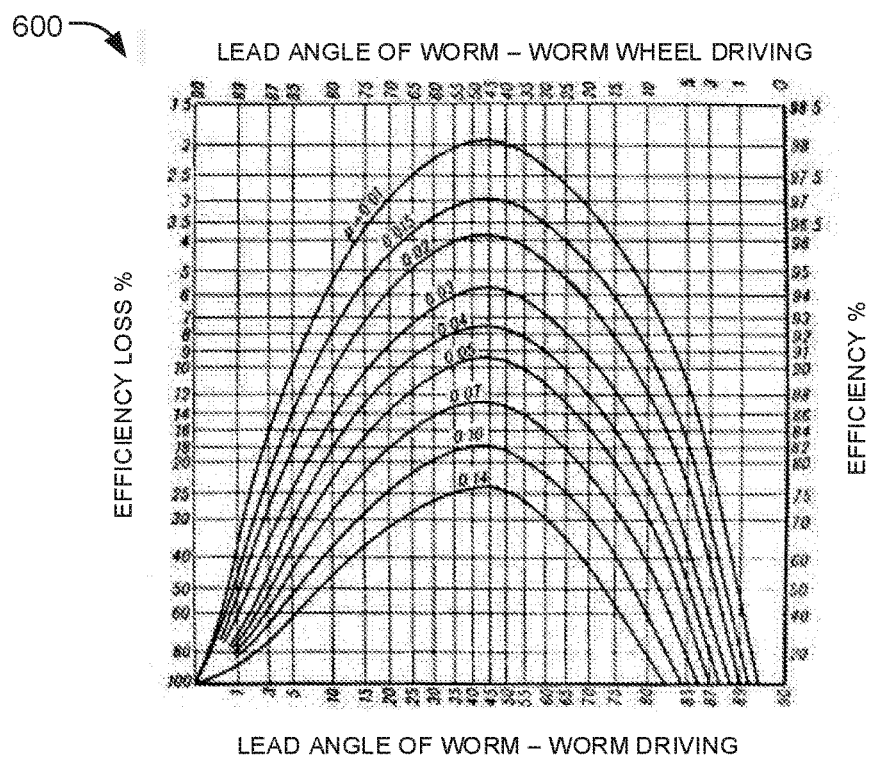
FIG. 6 depicts a chart indicating the example lead angles and efficiency of worm gears that may be implemented with the example apparatus herein.

FIG. 6 depicts a chart 600 indicating the example lead angles and efficiency of worm gears 216, 224 that may be implemented with the example actuator 200 herein. As shown in the chart 600, efficiency is a function of the lead angle. The smaller the lead angle, the higher the efficiency of the worm gear 216, 224 when the worm gear 216, 224 is driving. Conversely, the lower the lead angle, the lower the efficiency when the worm wheel 220, 226 is driving (e.g., backdrive efficiency).

Based on the results of Equation 6, the forward drive efficiency of the first gear stage 212 can be determined. The first gear stage 212 implemented in the illustrated example has a forward drive efficiency of approximately 81 percent, with a diametrical pitch of 14 and a friction angle of 1.08 degrees. The second worm gear 224 has a second lead angle approximately ten degrees or less. In the illustrated example, the second lead angle is 10.305 degrees. The second worm gear 224 meshes with the second worm wheel 226 to form the second gear stage 214. The second gear stage 214 implemented in the illustrated example has a forward drive efficiency of 91 percent, with a diametrical pitch of 6 and a friction angle of 1.22 degrees.

The ball screw 206 has a forward drive efficiency of 87 percent. The total forward drive efficiency of the example transmission 204 is 64%. The backdrive efficiency can be determined using the lead angles rather than the friction angles, which is a conservative approach. The backdrive efficiency determined using the first and second lead angles is 0.000371 percent. The backdrive efficiency is reduced such that the backdrive force is less than a combination of any resistive forces and/or torques of the motor 202 that act in an opposition to the backdrive force.

Any motor 202 having a cogging torque of at least 0.03 in-lbs will prevent backdrive of the example transmission under loads up to 9,930 lbs. The combination of the multi-pass worm gear transmission 204 and the motor 202 having resistive forces and/or torques equivalent to 0.03 in-lbs substantially eliminates backdrive of the actuator 200 to maintain the position of the flaps 110, 112 against the force of the air flow around the wings 108.

Selecting appropriate first and second lead angles for the first and second gear stages 212, 214 assures a desired backdrive efficiency that can be overcome by the resistive forces and/or torques of the motor 202, thus eliminating the need for a no-back device or other braking device. The lead angles in the above example are not limiting, but other lead angles that satisfy the given efficiency requirements may be used instead. Additionally, additional gear stages may be included to further reduce the backdrive efficiency. For example, a third stage may include a third worm gear having a third lead angle to mesh with a third gear. The third lead angle may be selected from a range of lead angles determined based on the first and second lead angles. The example third gear stage and/or other additional gear stages are not shown for simplicity. Thus, any number of gear stages having a gear and a worm gear that is sufficient to prevent backdrive may be implemented in the example actuator 200.

Figure 7:
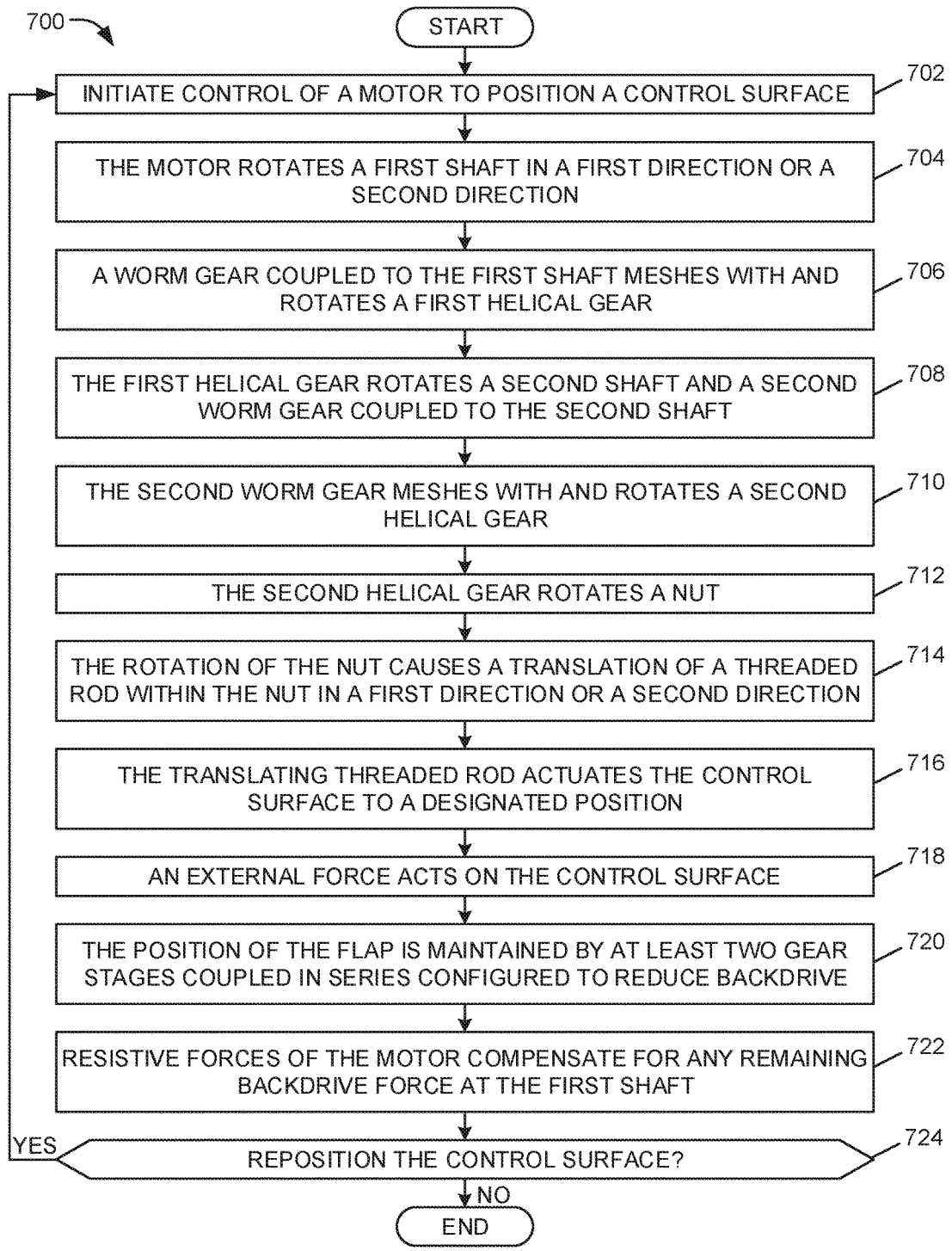
FIG. 7 is a flowchart depicting an example method of operation of the example apparatus.

FIG. 7 is a flowchart depicting an example method 700 of operation of the example apparatus 200. The example method 700 begins and an operator initiations control of the motor 202 to position a control surface (e.g., flaps 110, 112) (block 702). The motor 202 rotates a first shaft (e.g., the input shaft 218) in a first direction or a second direction (block 704). The first worm gear 216 coupled to the input shaft 218 meshes with and rotates the first worm wheel 220 (block 706). The first worm gear 216 and the first worm wheel 220 form the first gear stage 212. The first worm wheel 220 rotates the second shaft (e.g., the intermediate shaft 222) and the second worm gear 224 coupled to the intermediate shaft 222 (block 708). The second worm gear 224 meshes with and rotates the second worm wheel 226 (block 710). The second worm gear 224 and the second worm wheel 226 form the second gear stage 214. The second worm wheel 226 rotates the nut 228 to which the second worm wheel 226 is coupled (block 712). The rotation of the nut 228 causes the translation of the ball screw 206 (e.g., a threaded rod) within the nut 228 in a first direction or a second direction (block 714). The translation of the ball screw 206 actuates the flaps 110, 112 to move the flaps 110, 112 to a designated position (block 716). An external force or pressure (e.g., due to airflow over the wing 108 of the aircraft 102) acts on the flaps 110, 112 (block 718). The position of the flaps 110, 112 is maintained by the at least two gear stages 212, 214 coupled in series and having lead angles to reduce backdrive at each gear stage 212, 214 of the transmission (block 720). The resistive forces of the motor 202 compensate for any remaining backdrive force at the input shaft 218 between the first gear stage 212 and the motor 202 (block 722). If the operator determines that the flaps 110, 112 should be repositioned (block 724), the operator may again initiate control of the motor 202 (block 702).

Illustrative Aircraft and Associated Method

An aircraft manufacturing and service method 800 (see FIG. 8) and an aircraft 902 (see FIG. 9) will now be described to better illustrate various features of processes and systems presented herein.

Figure 8:
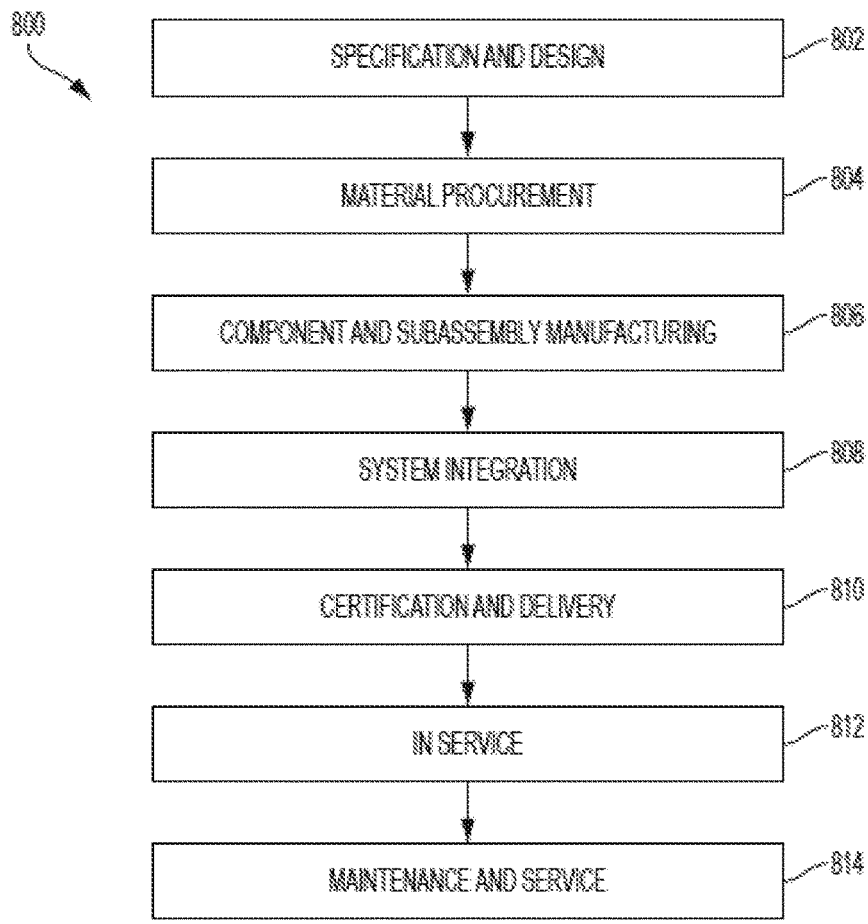
FIG. 8 is a flowchart depicting operations in the life cycle of an illustrative aircraft, from early stages of manufacturing to entering service, in accordance with aspects of the present disclosure.

As shown in FIG. 8, during pre-production, aircraft manufacturing and service method 800 may include specification and design 802 of the aircraft 902 and material procurement 804. The production phase involves component and subassembly manufacturing 806 and system integration 808 of the aircraft 902. Thereafter, the aircraft 902 may go through certification and delivery 810 in order to be placed in service 812. While in service by a customer, the aircraft 902 is scheduled for routine maintenance and service 814 (which may also include modification, reconfiguration, refurbishment, and so on). While the embodiments described herein relate generally to servicing of commercial aircraft, they may be practiced at other stages of the aircraft manufacturing and service method 800.

Each of the processes of aircraft manufacturing and service method 800 may be performed or carried out by a system integrator, a third party, and/or an operator (e.g., a customer). For the purposes of this description, a system integrator may include, without limitation, any number of aircraft manufacturers and major-system subcontractors; a third party may include, for example, any number of vendors, subcontractors, and suppliers; and an operator may include an airline, leasing company, military entity, service organization, and so on.

Figure 9:
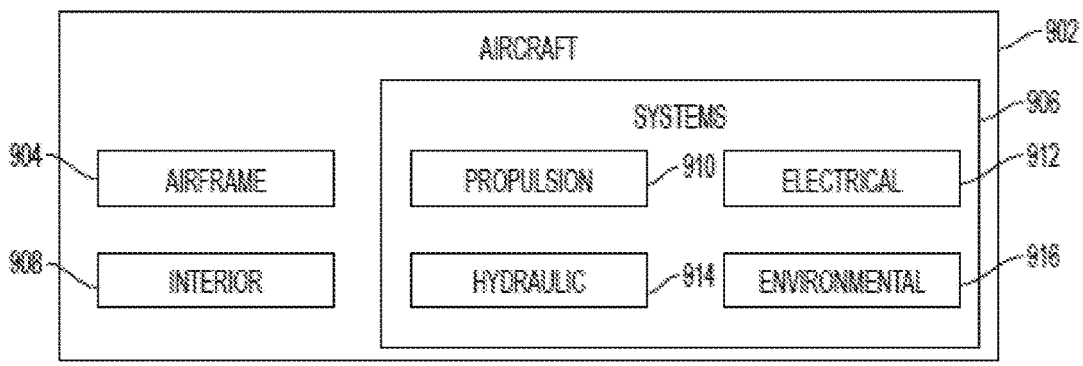
FIG. 9 is a block diagram of selected components of an illustrative aircraft, in accordance with aspects of the present disclosure.

As shown in FIG. 9, the aircraft 902 produced by aircraft manufacturing and service method 800 may include an airframe 904, which may include one or more airfoils or flaps such as flaps 110, 112, multiple systems 906, and an interior 908. Examples of systems 906 include one or more of propulsion system 910, electrical system 912, hydraulic system 914, and/or environmental system 916. Any number of other systems may be included in this example. Although an aircraft example is shown, the present teachings may be applied to other industries, such as the automotive industry.

Apparatus and methods embodied herein may be employed during any one or more of the stages of the method 800. For example, components or subassemblies corresponding to component and subassembly manufacturing 806 may be fabricated or manufactured in any suitable manner.

One or more apparatus embodiments, method embodiments, or a combination thereof may be utilized during component and subassembly manufacturing 806 and system integration 808, e.g., by substantially expediting assembly of or reducing the cost of aircraft 902. Similarly, one or more of apparatus embodiments, method embodiments, or a combination thereof may be utilized while aircraft 902 is in service, e.g., during system integration 708 and/or maintenance and service 814.

From the foregoing, it will be appreciated that the above disclosed apparatus and articles of manufacture are operative to prevent backdrive of an actuator for a high lift device without the use of a brake or no back and, thus, reduce the cost and weight of the actuator and increase the reliability of the actuator.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft comprising:
   a high lift device moveably coupled to a wing of the aircraft; and
   an actuator to move the high lift device, the actuator including:
   a motor; and
   a transmission, the transmission including a first gear stage and a second gear stage coupled in series, the first gear stage including a first worm gear and the second gear stage including a second worm gear, the first worm gear coupled to the motor via an input shaft, the input shaft having a detent at an interface between the input shaft and the motor to add a resistive force between the first gear stage and the motor, an arrangement of the first worm gear, the second worm gear, the motor and the resistive force configured to prevent backdrive of the actuator.

2. The aircraft of claim 1, wherein the transmission of the actuator further includes a first worm wheel to mesh with the first worm gear, the first worm wheel coupled to the second worm gear via a first stage shaft.

3. The aircraft of claim 2, wherein the actuator includes a ball screw, and wherein the transmission includes a second worm wheel to mesh with the second worm gear, the second worm wheel coupled to a nut, the second worm wheel and the nut rotatable relative to the ball screw.

4. The aircraft of claim 3, wherein the ball screw includes a rod end coupled to the high lift device.

5. The aircraft of claim 3, wherein the first worm gear has a first lead angle and the second worm gear has a second lead angle larger than the first lead angle.

6. The aircraft of claim 5, wherein the first lead angle and the second lead angle are selected from a range of lead angles sufficient to prevent backdrive of the actuator.

7. An aircraft wing comprising:
   a high lift device; and
   an actuator to move the high lift device, the actuator including:
   a motor;
   an input shaft;
   a first gear stage including a first worm gear having a first lead angle within a first range of lead angles, the first worm gear coupled to the motor via the input shaft, the input shaft having a detent at an interface between the input shaft and the motor to add a resistive force to at least partially counter-act backdrive force from the first gear stage; and
   a second gear stage including a second worm gear having a second lead angle within a second range of lead angles, wherein the second range of lead angles is inclusive of the first range of lead angles.

8. The aircraft wing of claim 7, wherein the actuator includes a first worm wheel, the first worm gear coupled to the input shaft to rotate relative to the first worm wheel.

9. The aircraft wing of claim 8, wherein the first worm wheel is coupled to the second worm gear via an intermediate shaft, the second worm gear to rotate relative to a second worm wheel.

10. The aircraft wing of claim 9, wherein the actuator includes a ball screw, the second worm wheel coupled to the ball screw.

11. The aircraft wing of claim 10, wherein the ball screw has a rod end coupled to the high lift device.

12. The aircraft wing of claim 11, wherein the actuator includes a nut disposed between the second worm wheel and the ball screw, the nut being fixed to the second worm wheel and rotating relative to the ball screw as the second worm wheel rotates.

13. The aircraft wing of claim 7, wherein the first lead angle of the first worm gear and the second lead angle of the second worm gear reduce a backdrive efficiency to less than one percent to substantially prevent backdrive of first and second worm gears and first and second worm wheels.

14. A method comprising preventing backdrive of an actuator coupled to a high lift device of an aircraft using at least two gear stages coupled in series and a motor coupled to the gear stages, each of the gear stages including a worm gear to reduce a backdrive efficiency at each of the gear stages, the gear stages coupled to the motor via a first shaft, the first shaft having a detent at an interface between the first shaft and the motor, wherein, when a backdrive force is applied, the reduced backdrive efficiency at the first shaft results in a force that is less than a resistive force of the motor and a resistive force from the detent such that the resistive forces contribute to the reduced backdrive efficiency to prevent backdrive of the actuator.

15. The method as described in claim 14 further comprising positioning the high lift device using the actuator, which includes the motor and the at least two gear stages, wherein positioning the high lift device includes:
   rotating the first shaft via the motor coupled to a first end of the first shaft, the first shaft including a second end having a first worm gear coupled to the second end, the first worm gear to mesh with a first worm wheel;
   rotating a second shaft via a rotation of the first worm wheel coupled to a first end of the second shaft, the second shaft including a second worm gear coupled to a second end of the second shaft, the second worm gear to mesh with a second worm wheel; and
   translating a rod within a sleeve, the sleeve to rotate with the second worm wheel as the second worm wheel rotates, the rod to actuate the high lift device of the aircraft.

16. A method comprising:
   positioning a high lift device of an aircraft using an actuator including a motor; and
   maintaining a position of the high lift device during a maneuver performed by the aircraft, wherein maintaining the position includes preventing backdrive of the actuator using at least two gear stages coupled in series, each of the gear stages including a worm gear to reduce a backdrive efficiency at each of the gear stages, the gear stages coupled to the motor via a first shaft, the first shaft having a detent at an interface between the first shaft and the motor, wherein, when a backdrive force is applied, the reduced backdrive efficiency at the first shaft results in a force that is less than a resistive force of the motor and a resistive force from the detent such that the resistive forces contribute to the reduced backdrive efficiency to prevent backdrive of the actuator.

17. The method of claim 16, wherein positioning the high lift device includes:
   rotating the first shaft via the motor coupled to a first end of the first shaft, the first shaft including a second end having a first worm gear coupled to the second end, the first worm gear to mesh with a first worm wheel;
   rotating a second shaft via a rotation of the first worm wheel coupled to a first end of the second shaft, the second shaft including a second worm gear coupled to a second end of the second shaft, the second worm gear to mesh with a second worm wheel; and
   translating a rod within a sleeve, the sleeve to rotate with the second worm wheel as the second worm wheel rotates, the rod to actuate the high lift device of the aircraft.

18. The method of claim 17, wherein an inner surface of the sleeve is threadably coupled to an exterior surface of the rod such that rotation of the sleeve causes the translation of the rod.

19. The method of claim 17, wherein rotating the first shaft in a first direction translates the rod such that the high lift device of the aircraft is extended and rotating the first shaft in a second direction translates the rod such that the high lift device is retracted.

20. The aircraft of claim 1, wherein the high lift device is a trailing edge flap.

21. The aircraft of claim 1, wherein the high lift device is a leading edge flap.

* * * * *